Dec. 8, 1936.　　　　O. SEVERSON　　　2,063,129
DRAWBOLT TOOL HOLDER AND BIT
Filed July 31, 1934
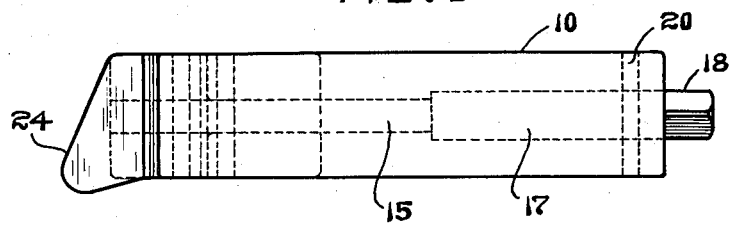
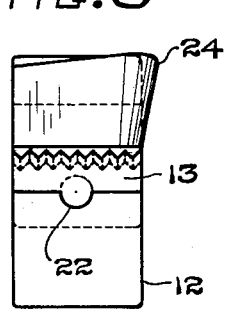 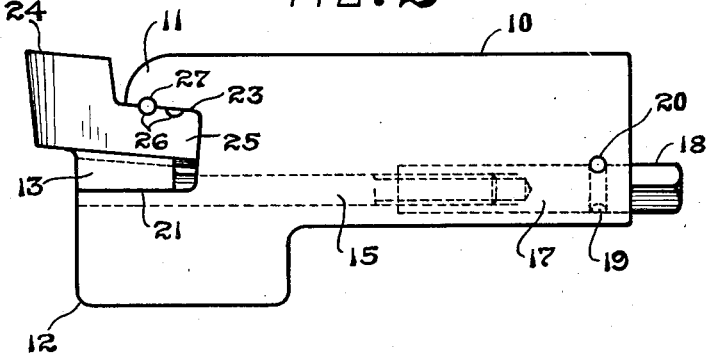
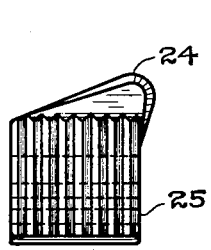 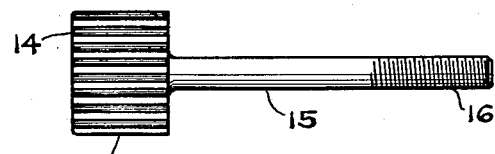
INVENTOR.
OLE SEVERSON
BY A. T. Sperry
ATTORNEY Patented Dec. 8, 1936

2,063,129

UNITED STATES PATENT OFFICE 2,063,129

DRAWBOLT TOOL HOLDER AND BIT

Ole Severson, Shelton, Conn., assignor to The Apex Tool & Cutter Company, Inc., a corporation of Connecticut Application July 31, 1934, Serial No. 737,701

1 Claim. (Cl. 29—100)

The invention relates to improvements in tool bits and tool holders, therefor, of the draw-bolt type and particularly designed for use in connection with metal working apparatuses, such as, boring mills, lathes, planers and the like.

It is among the general objects of the invention to provide a new and efficient bit and holder assembly, which will give increased rigidity to the structure, holding a cutting tool in contact with the surface to be worked.

Another object of the invention is to provide the structure with an interrelationship of parts and which is designed to reproduce, to a minimum, the possibility of movement between the bit and holder so as to avoid any chattering and consequent vibration in the work form thereby.

Another important object is to provide the adjustability in the relation of the bit with the holder, the same being accessible without loss of rigidity.

A further object is to provide a structure of minimum parts and maximum efficiency so as to be highly efficient, from a commercial standpoint, in this highly developed field.

Other objects featured in the invention will be apparent from a consideration of the present specifications taken in connection with the accompanying drawing in which Figure 1 is a top plan view of a tool bit and tool holder assembly made in accordance with the present invention.

Figure 2 is a side elevation of the structure shown in Figure 1.

Figure 3 is an end elevation.

Figure 4 is a top plan detailed view of the draw-bolt alone; and

Figure 5 is a bottom plan view of the tool bit.

The tool holder is generally characterized by the provision of a furcated and elongated tool body, which adjustably receives, within the furcation thereof, a tapered tool-seat, the upper face of which is serrated to bear against the under serrated face of the bit also received between the furcation and to be forced, by the tapered formation of the tool-seat, against the opposite face of the furcation.

The tool-seat is adapted to be drawn inwardly to apply the holding force upon the bit by means of a draw-bolt extending longitudinally through the holder.

The invention is, also, characterized by the provision of recesses in the upper face of the bit shank, one of which may receive a projection in the form of a cross-pin, which, also, enters the contacting face of the furcation so as to preclude outward movement of the bit, and a plurality of such depressions being provided so that longitudinal adjustment of the bit in the holder may be accomplished.

Referring more particularly to the drawing, the numeral 10 indicates the body of the shank of the tool holder, the forward end of which is furcated, including an upper furcation, or wall portion 11, and a lower furcation, or wall portion 12. The tapered tool-seat is indicated by the numeral 13 and includes the serrations 14, shown in Figure 4, which extend longitudinally of the holder and of the draw-bolt 15 of the tool-seat. The extreme end of the draw-bolt being threaded, as at 16, to be engaged by internal threads of a hollow drawing member 17, which has a square extension 18, extending beyond the body and, which has a groove 19, which may be engaged by a cross-pin 20, so as to preclude longitudinal movement of the drawing member 17 upon rotation thereof. Obviously, the rotation of the member 17 will, through its engagement with the threaded end 16, produce a longitudinal movement of the draw-bolt 15 and the tool-seat 13; the direction of movement being determined by the direction of rotation.

The bottom of the tool-seat 13 is preferably straight and alined with the axis of the draw-bolt 15, thus it rides upon the flat face 21 of the lower wall, or furcation, 12. As noted in Figure 3, the draw-bolt 15 extends beyond the lower surface of the tool-seat 13 and its forward end rests in a recess indicated at 22 in Figure 3. This arrangement provides an added means of maintaining a rigid positioning of the tool-seat 13. The upper face of the tool-seat 13, having serrations 14, is tapered and lies in a plane angularly related to the axis of the draw-bolt 15. The inner face 23 of the wall, or furcation 11, is, also, disposed at an angle preferably parallel with the top surface of the tool-seat 13, whereby the two together provide a straight wall, which is recessed, extending in a slight angle with respect to the axis of the holder.

The bit, itself, includes the cutting edge 24 and the tool shank 25, the latter having a lower serrated face, as shown in Figure 5, which cooperates with the serrations 14 of the tool-seat in providing a juncture, therebetween, which is not susceptible to vibratory movement of one part with respect to another. The upper face of the shank 25 is provided with recesses 26, one of which receives a transversely extending drill rod 27, which is secured within the lower face of the wall 11, thus providing a lock to secure the bit against longitudinal movement with respect to the holder. The provision of the two recesses 26 permits the bit to be set with either recess engaging the member 27 and, thus providing an adjustable positioning of the bit.

With the parts assembled in the manner shown, it will be seen, by turning the head 18 of the drawing member 17, the tool-seat 13 will be drawn rearwardly and such movement will diminish the space between the upper serrated surface of the tool-seat and the lower parallel surface of the wall 11. By positioning the tool bit and the shank within the space, therebetween, it will be noted that such drawing will firmly and securely lock the shank and tool bit with its holder. The cooperating serrations between the shank and the tool bit will act to preclude accidental transverse movement, or chattering, between the parts, while the member 17 will cooperate to preclude longitudinal vibration.

From the foregoing, it will be seen that the present structure provides a simple and efficient assembly, which firmly secures a tool bit in its holder. It will be understood that numerous changes and modifications, and the full use of the equivalent, may be resorted to in the practice of the invention without departing from the spirit or scope of the invention as outlined in the pending claim.

What I claim is:

A lathe tool holder and bit assembly including a longitudinally extending tool holder body having a furcation at the forward end thereof which forms a pair of facing surfaces and end wall surfaces; one of the facing surfaces being parallel with the longitudinal axis of the body and the other facing surface being inclined with respect thereto, and the end wall being disposed at an inclination to a plane extending through the body at right angles to the axis thereof; a tool bit having a shank received within said furcation, the shank having parallel walls, one contacting with the inclined surface, and a bit retainer having a shank and an up-standing head, the head having walls disposed at an angle equal to the angle of divergence between the facing surfaces of the furcation, one of its surfaces contacting with the surface parallel to the axis of the body and the other surface engaging the shank in parallelism therewith to secure the shank between it and the other facing surface of the furcation; means engageable between said angularly disposed facing surface and the shank to lock the shank against longitudinal movement from the furcation; the parallel surface of the furcation being cut away to receive and fit the shank of the retainer thus to provide interengaging means between the shank and the retainer for restraining the retainer against transverse movement and interengaging means between the retainer and said bit surface parallel with the longitudinal axis of the body for maintaining rigid positioning of the bit shank, and means for moving the bit retainer longitudinally inwardly and outwardly within said furcation.

OLE SEVERSON.